Figure 1:
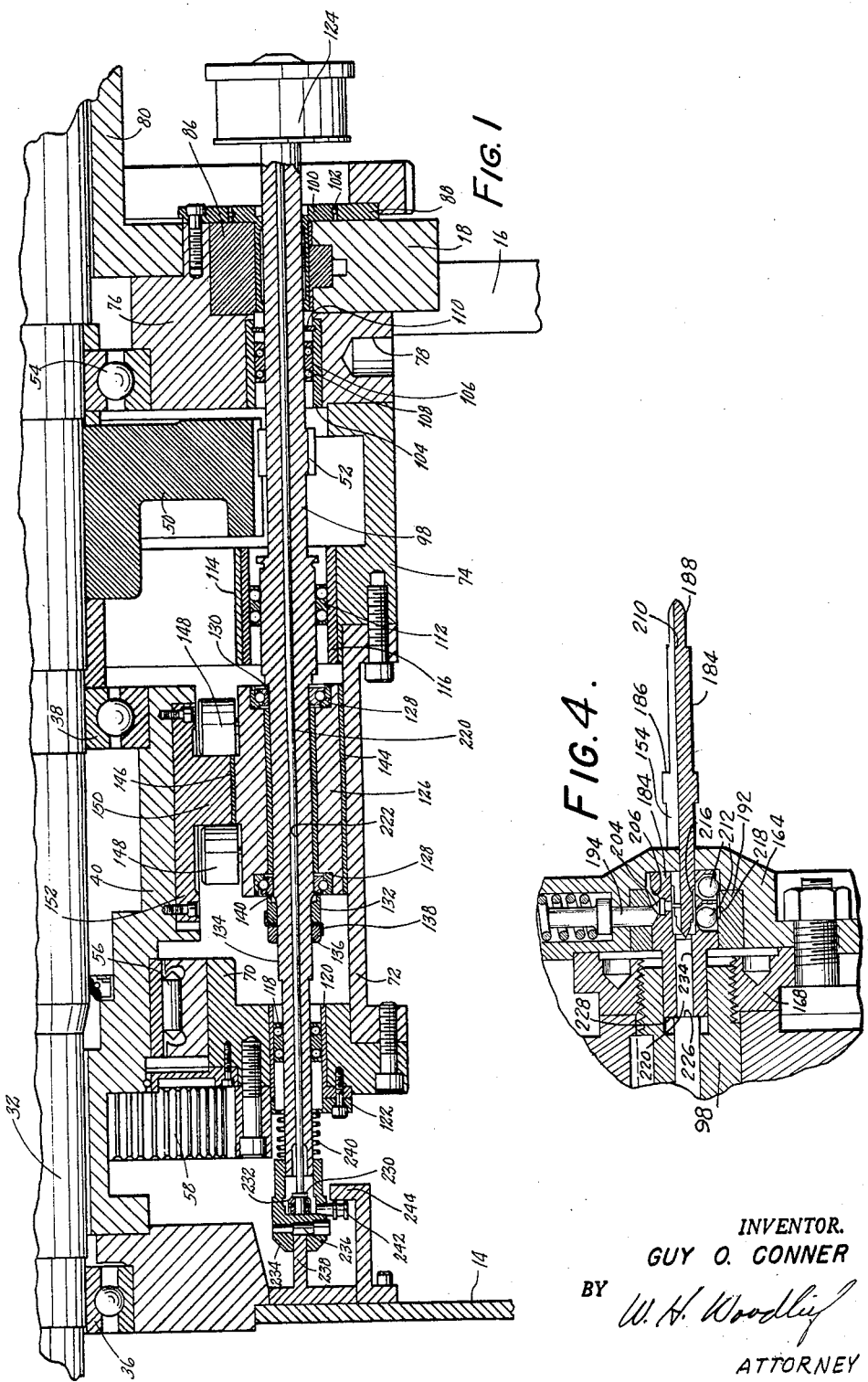

May 29, 1962 G. O. CONNER 3,036,319
RELEASABLE TOOL HOLDER AND OPERATING MEANS THEREFOR
Original Filed March 12, 1951 5 Sheets-Sheet 1

INVENTOR.
GUY O. CONNER
BY
W. H. Woodley
ATTORNEY

INVENTOR.
GUY O. CONNER
BY W. H. Woodlief
ATTORNEY

May 29, 1962 G. O. CONNER 3,036,319
RELEASABLE TOOL HOLDER AND OPERATING MEANS THEREFOR
Original Filed March 12, 1951 5 Sheets-Sheet 3

INVENTOR.
GUY O. CONNER
BY W. H. Woodley
ATTORNEY

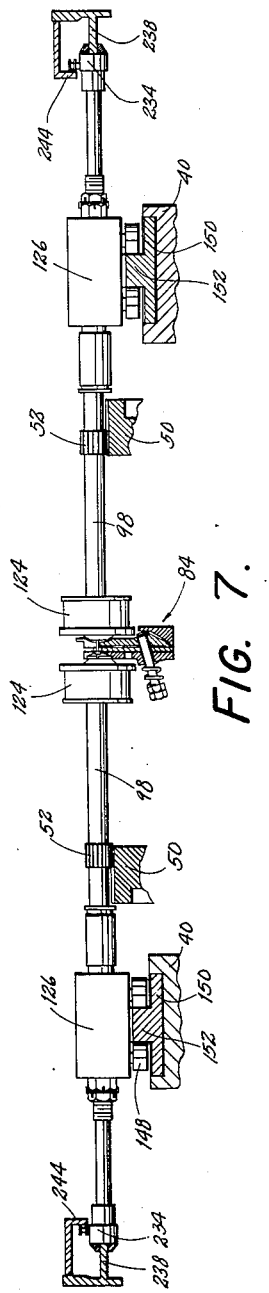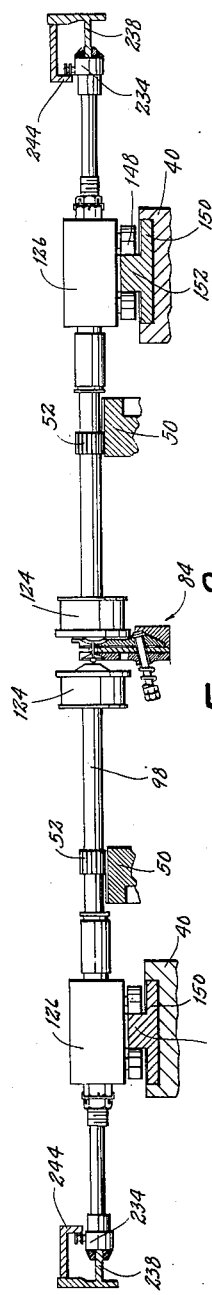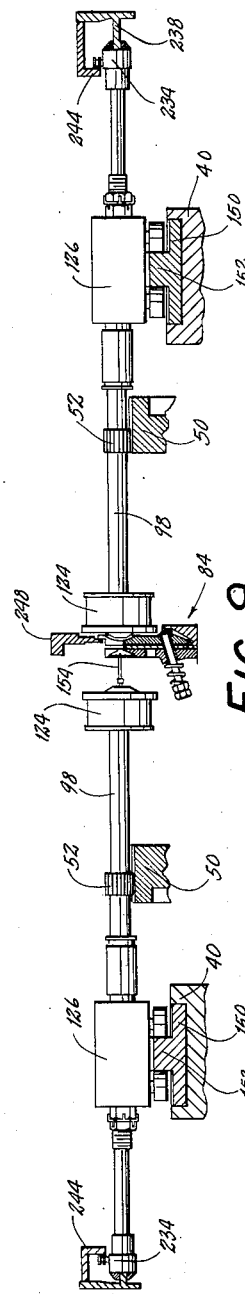

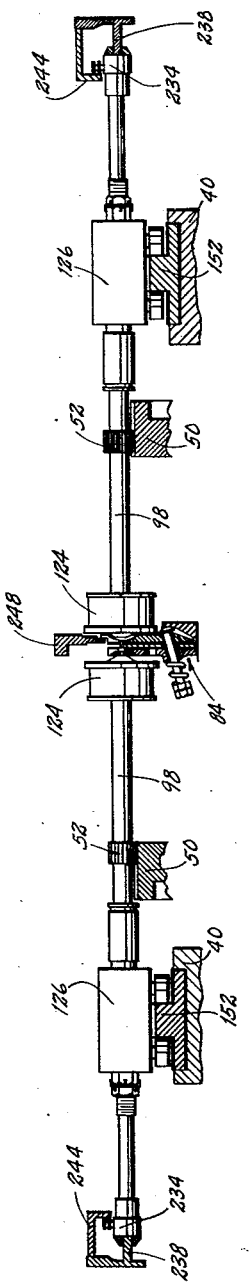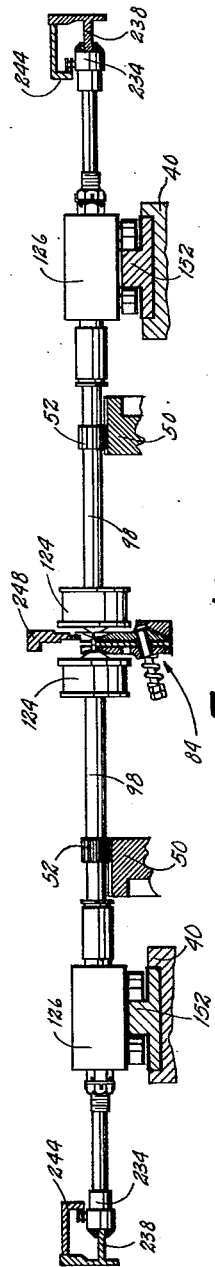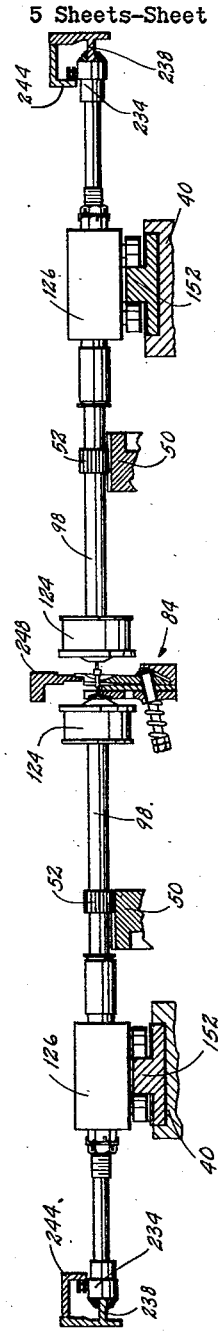

United States Patent Office 3,036,319
Patented May 29, 1962

3,036,319
RELEASABLE TOOL HOLDER AND OPERATING MEANS THEREFOR
Guy O. Conner, Cleveland, Ohio, assignor to Republic Steel Corporation, Cleveland, Ohio, a corporation of New Jersey
Original application Mar. 12, 1951, Ser. No. 215,131, now Patent No. 2,828,492, dated Apr. 1, 1958. Divided and this application Mar. 25, 1958, Ser. No. 723,865
13 Claims. (Cl. 10—134)

This invention pertains to a tool holder and the mechanism associated therewith by which a tool is operated. The invention is adapted to machine tools for forming metal and more particularly to a machine adapted for high speed performance of a variety of operations such as spinning, tapping, drilling or the like. The invention has particular utility in the tapping or threading of nuts, and other operations similar to these. This application is a division of my United States Patent No. 2,828,492, dated April 1, 1958, for Nut Tapping Machine Having Releasable Tap Holding Means to Discharge Tapped Nuts Therefrom.

Current practice in the threading of nuts utilizes a machine in which the tapping tool is bent at the end opposite the working end and is loosely disposed in a complementary recess in the machine. Onto this the nuts are threaded, while the tap is prevented from rotating and is held against longitudinal motion by the bent end. As ths nuts are finished, they slide along the tool, around the bent end and off into a receptacle. The cost of these taps is considerable, but other more serious disadvantages are also present. Because of the looseness of the tool in its recess, it has heretofore been virtually impossible to get a fit closer than Class 1 or 2 on a nut produced by such methods. The device also is relatively slow and the finish on the threads poor, compared to that on the bolts onto which the nuts are to be threaded.

Many other devices have been proposed for this type of work. In some, the tap was driven in and then reversed to recover the tool. This was expensive both in time and in tool wear, since the tool passed through the workpiece twice for one operation. Other devices used a rotating head having a plurality of vertical spindles. In these, the tap would be driven through the nut, drop into a cup and then be picked up again by the spindle as the nut was moved out of the way. These, too, were not entirely satisfactory, partly because the tap could not be held tightly enough to produce an accurate thread.

With the machine of my invention, most of the disadvantages of prior art machines are avoided. In addition, great savings are possible. As an example, a single machine having tool holding and operating mechanism according to my invention may be made to produce as many nuts in a given time as from 10 to 20 of present day machines. Moreover, by such a device, a single operator may tend each machine where under present day conditions an operator customarily tends two machines. Thus, for a unit labor cost, a machine built according to my invention will produce from five to ten times as many nuts. The total effect of these savings makes possible extremely fast production of the product of the machine at low cost, both in direct cost of the product and in overhead.

In addition to lessened cost, the quality of the product is greatly improved. Where with present day machines nut threads having a fit of Class 1 or 2 are ordinarily produced, and a Class 3 fit is rare; with my invention, nuts of Class 4 fit may easily be produced, and Class 5 fits are not uncommon. In order to achieve this sort of fit, it is obvious that no tearing of metal nor looseness of parts can be allowed. These conditions also make possible a much better finish on the surface of the threads with the resultant advantages of increased strength and ease of threading.

The tools are driven through the work blank by spindles which are, in turn, governed by cams on the machine. These tools are short and are firmly held at both ends while cutting the thread. The machine therefore eliminates all play in the spindles, tools and the workpiece.

A more complete understanding of the device of the invention, and the invention itself, may be had by reference to the fellowing description and drawings which form a part of this specification.

Figure 2:
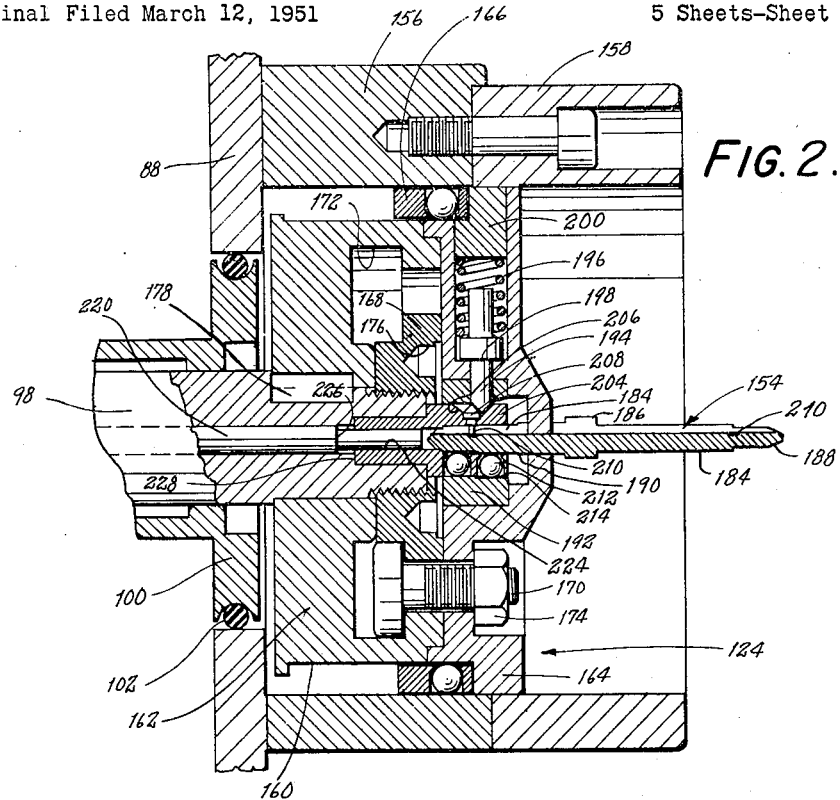
Figure 3:
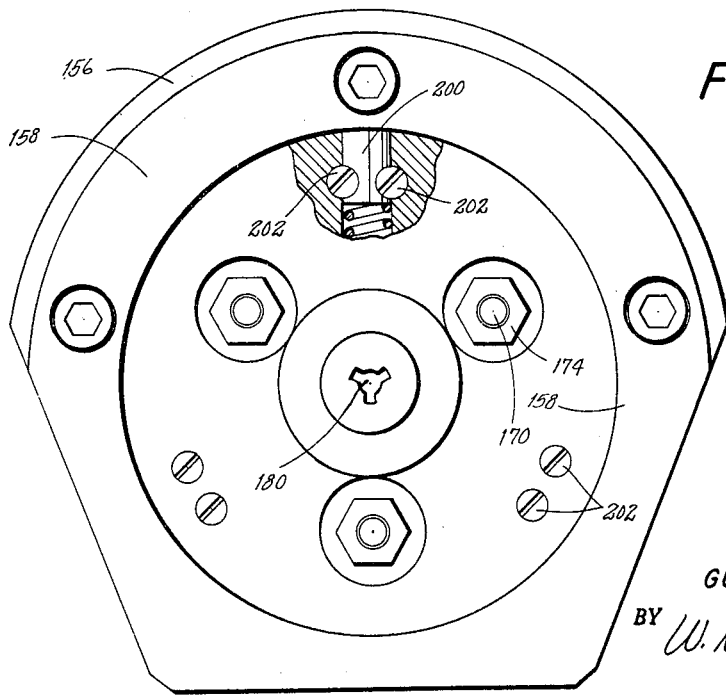

In the drawings:
FIG. 1 is an enlarged sectional view of the spindle drive mechanism shown in my above-mentioned United States patent;
FIG. 2 is a sectional view on the vertical centerline of the tool holder which is the subject hereof;
FIG. 3 is an end-elevational view of the tool holder mounted as in FIG. 2;
FIG. 4 is a fragmentary view similar to FIG. 2 showing the tool shank in a partly retracted position; and
FIGS. 5–12, inclusive, are progressive, partly diagrammatic, sectional view showing the location of the spindles and tool holders at eight different circumferential points in the travel of the spindles; each of the views being taken on a plane including the centerline of the spindle and the main shaft of a machine such as that in my above-mentioned United States patent, the views each being turned upright for uniformity.

Briefly, my invention is intended for use in an automatic machine having one or more horizontal spindles operated from a central shaft. The spindles, in addition to being rotated about the central axis of the machine, revolve to drive a tool and are moved axially by a stationary cam or similar actuating mechanisms. The spindles are very accurately and firmly located to avoid misalignment or play. As shown in my United States Patent 2,828,492, the spindles are arranged around the central axis of the machine in two matched sets, each spindle having an axially aligned, matching spindle facing it from the opposite set. The tool holders are adapted to hold a tool very firmly yet are able to release the tool to be picked up by the opposite head. Cam operated rods extending through the spindles provide positively operated means for passing the tool from one head to another. The tool must be provided with shanks at both ends of the thread cutting part for the heads to grasp in order for the tool to be passed in this manner.

As indicated in FIGS. 5–12, and as fully disclosed in my above-mentioned patent, the center of the machine between the two spindles is occupied by a work holding mechanism adapted to receive a workpiece for each pair of spindles. The work holder securely clamps the workpiece in a fixed position determined by a pilot part of the forming tool and is thus accurately located relative to the spindles. The work holder carries the workpiece along in fixed relation to the spindles to a discharge point where it is discharged positively from the work holder.

Figure 5:
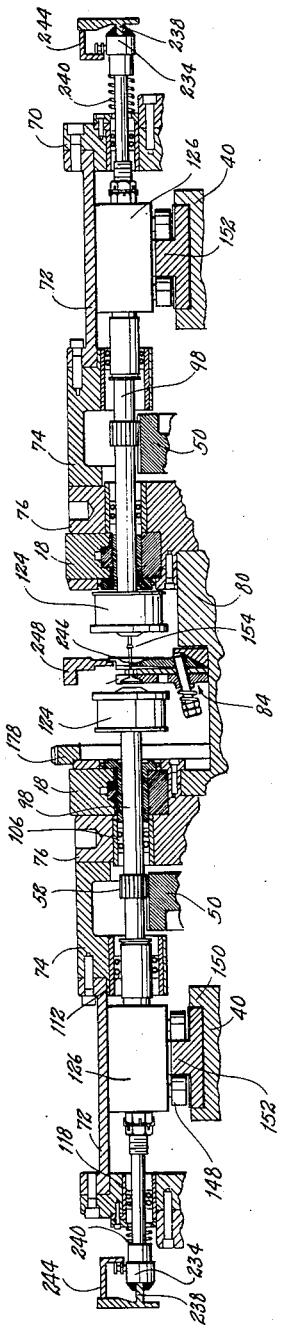

As fully disclosed in my aforesaid patent and as indicated in FIG. 5, the machine in which the tool holder and its operating mechanism herein are embodied provides co-axial tool driving shafts 98 which are mounted in opposite ends of the machine. The shafts, at their spaced confronting ends, carry tool holding heads 124 such that the tool holding heads are disposed at opposite faces of a rotating work holder 84. The operating mechanism is supported on a single main drive shaft 32 which is fully illustrated in FIG. 3 of my aforesaid patent and which is shown in part in FIG. 1 herein. Without delving into details of the threading machine per se, it will be sufficient to note that power is ultimately delivered to the main drive shaft 32. The main drive shaft is journalled in supporting standards 14 and 16 disposed along the length of the machine. The shaft 32 (FIG. 1) is journalled near its end in end bearing (not shown) in the outer walls of the standards 14 and also in near end bearings 36 in the inner walls thereof. Still further support is provided approximately mid-way between the center of the shaft and both ends by near center bearings 38 mounted in the central stationary members 40. These latter members are bolted or otherwise suitably mounted on the inner walls of the standards 14 at both ends. Thus, each half of the shaft is supported by four bearings, three of which are shown in FIG. 1. Firm support, such as this, is necessary, because the shaft is the sole support for nearly all of the operating mechanism of the machine. Furthermore, such support will help to prevent whipping of the long shaft.

FIG. 1 discloses the mechanism for driving and controlling one tool at one side of the work holder. There are a plurality of tool driving shafts mounted for operation in one end of the machine, and an equal paired number in the other end. Identical mechanism is employed for controlling the several tool driving heads. Therefore, a description of the tool driving shaft of FIG. 1 and the mechanism associated therewith will serve as a disclosure of the whole.

A large bull or sun gear 50 is keyed to the shaft 32 adjacent to and inboard of the near center bearings 38. This gear is the sun gear for a planetary gear system formed by planetary pinion 52 and those of the other tool driving shafts of the set. These pinions are carried about the sun gear 50 by an irregular shaped drum supported partly on the shaft by center bearings 54 and partly on the stationary members 40 by roller bearings 56. This drum is driven through an internal ring gear 58, driven by a pinion which is not shown.

The ring gear 58 is mounted on an end plate 70 which also supports the roller bearings 56. The end plate 70 is connected to the rest of the drum by a cover member 72 which may conveniently be bolted to the end plate 70 and to the spindle supporting member 74. The spindle supporting member 74 is fastened to the inner wall member 76. Holes 78 may be provided in the wall member 76 into which a bar may be inserted for turning the machine by hand, if desired. The wall member 76 holds the center bearings 54 and also helps to support the drum. A center hub 80 joins the wall members from both sides and completes the basic structure of the rotating drum. A second spindle support member 86 may be bolted, or otherwise fastened to the wall member 76, and a cover plate 88 may be used to cover the complete end of the assembly. The cover 88 and spindle support 86 slide freely relative to a guide member 18.

As noted above, the eight spindles on each side are driven by the meshing engagement of the bull gear 50 with the pinions 52 on the spindles (FIG. 1). Each of the spindles is adapted for longitudinal as well as rotary motion, thus being adapted to carry driving heads which drive a tool in a rotary motion while feeding it through a nut blank, or other workpiece, and then following discharge of the finished nut, the heads carried by the spindles return the tool to its original position. It will be apparent that, while the shaft 32 is rotating in one direction, the spindle-carrying drum device will be driven in the opposite direction because of the internal gear drive at the ends of the drum. Thus, the pinions 52 are carried around the bull gears 50 in a planetary manner and consequently are driven at a comparatively high speed. The pinions 52 may be formed as a part of the spindle 98 itself or may be suitably fixed thereto. As best shown in FIG. 1, the spindle 98 extends through four of the individual members of the rotating drum. At its right hand end in that figure, the spindle is journalled in a bronze bearing bushing 100 pressed into the support member 86. Suitable packing 102 is provided between the cover 88 and the flange of the bushing to keep dirt and chips isolated from the bearings within the drum member, and to keep cutting fluid and the like within the bushing as will appear hereinafter.

The spindle 98 next passes through the end wall member 76. At this point, a hardened steel bushing 104 is pressed into the member. The surface of the spindle adjacent this bushing is also hardened. A form of ball bearing which will journal the shaft both for rotational and longitudinal motion is provided in the space between the bushing and the spindle. This bearing is formed by a sleeve 106 made of brass or similar material and into which two or more circumferential rows of balls 108 are staked in holes formed therein. This assembly of balls and retainer is placed between the bushing 104 and the spindle shaft in that region which then act as races for the ball bearing. It is evident that, in addition to the rotary motion of a regular ball bearing, the spindle can move longitudinally, rolling the balls 108 on the bushing 104 and causing the retainer and ball assembly to move longitudinally one-half the distance moved by the spindle. The bearing is formed so that the balls are preloaded. That is, the diameters of the balls are slightly greater than the space allowed for them between the bushing 104 and the spindle 98. This preload is preferably of the order of .0003 to .0005 inch. A snap ring 110 may be provided for this bearing and may also be used for the others to hold standard oil seal rings in place if desired.

The second and third spindle bearings are similarly formed and preloaded. The second bearing 112 is located in an inwardly extending, wide flange 114 formed in the spindle support member 74. This bearing also includes a hardened bushing 116 pressed into an opening in the flange 114 as a race for the bearing. The third bearing 118 includes a bushing 120 pressed into the end plate 70 and on which the bearing may roll. A cover plate may be provided at this end to protect the bearings and retain grease.

At its end nearest the center of the machine, each spindle carries a tool holding head 124 which will be described in more detail hereinafter and with which this invention is mainly concerned. The pinion 52 is located between the first and second bearings 106 and 112, and a follower block 126 with controls the longitudinal movement of the spindle is located between the second and third bearings. The spindles are journalled in the follower block by two commercial angular contact ball bearings 128, one at each end of the block. A fixed position of the spindle relative to the block is maintained by engagement of one of the bearings with a shoulder 130 on the spindle against which the bearing is held by the pressure of a nut 132 against the other bearing. This nut is threaded on a threaded part 134 of the spindle shaft and is retained by a jam nut 136. A flanged washer 138 having portions bent over the flats of the nuts to prevent relative rotation therebetween is located between the nuts 132 and 136. The nut 132 may be partially bored out as shown to clear a shoulder 140 on the spindle.

The follower block 126 is an irregularly shaped block having an outer surface of parti-cylindrical form. A sheet 144 of brass or bronze or other bearing material covers this outer surface and is wrapped around the block having a tongue 146 extending between the two rollers 148 on each block. The rollers 148 may be standard anti-friction bearings mounted on headed pins threaded or otherwise held in the block. They are spaced apart just far enough to straddle a cam ridge 150 formed on cam segment blocks 152 which are held in the stationary part 40 of the support for the machine. Thus, while the rollers straddle the cam ridge 150, of this drum cam, they will translate any change in the location of that ridge into longitudinal motion of the spindle. However, since the follower block is free to rotate on the spindle, it is necessary to have some means of holding it in a fixed position with the rollers engaging the ridge. This is accomplished by the engagement of the outer surface of the brass sheet 144 with the inner surface of the cover member 72 which is finished as a bearing surface for the follower blocks to slide on longitudinally. Because of their wide arcuate outer surface, the blocks are then restrained from turning about the spindles. Both the spindles 98 and the cover member 72 rotate about the center of the machine at the same speed. Therefore, the only motion between the cover 72 and the follower block is the longitudinal sliding induced by the cam.

In FIGS. 2 and 3, the head 124 is shown enclosed in a housing formed of two similar pieces 156 and 158 bolted together and fixed to the cover plate 88. These pieces are formed with an accurately machined and hardened inner cylindrical surface. The outer surface 160 of the base 162 of the head and of a portion of the front plate 164 are also hardened and ground. A bearing assembly 166 similar to those provided for the spindle in both formation and function is inserted in preloaded condition between the head and the housing to provide additional support for the head.

The head is formed of three principal pieces: the base 162, a retaining nut 168 and the front plate 164. These parts are held together by square-headed bolts 170 engaged in an annular T-slot 172, formed by the base and retaining nut. The bolts 170 extend through spaced holes in the front plate and are fastened by nuts 174. The retaining nut 168 is screwed onto the end of the spindle and is formed with holes 176 to receive a spanner wrench. A key 178 engaged between the spindle and the base member 162 prevents relative rotation therebetween. The front plate 164 is formed with a central opening 180 shaped to fit the tool 154 which it is to carry (FIG. 3).

The tool 154 (FIG. 2) is formed with two shanks 182 and 184 on the ends of a thread cutting portion 186. This thread cutting portion may be formed as any thread cutting tap. The shanks also may be symmetrical but preferably are formed as shown in the drawings. The tool, as viewed in FIG. 2, is initially supported by the right hand shank, while it is inserted through the workpiece, is then gripped by the other head on the left hand shank. Both shanks are held during the cutting operation, after which it is carried solely by the left hand shank and is withdrawn completely from the workpiece which is then discharged, after which the tool is passed back so that the right hand shank is picked up and held as initially, the left hand shank being released. At the ends 188, the shanks are pointed to assure easy entry into the head. The left hand shank 182 is formed in three different diameters; the first two being useful in holding and releasing the tool easily from the head as will appear later. The largest, 190, of the three diameters acts as a pilot diameter to center the workpiece as the tool is inserted into the hole in the center of the blank. This operation of the machine will also be described in greater detail hereinafter. Since there is no need for a pilot on the right hand shank 184 where the nut is discharged, this shank is formed with only the two diameters.

The head is formed with novel holding means for the tool which provides for easy insertion and ejection of the tool while, at the same time, assuring a positive drive of the tool and the removal of any play from the grip. The drive of the tool is accomplished primarily by engagement of the shank 182 or 184 with the opening 180 in the head. The other characteristics are obtained from a loaded bearing arrangement formed in the head by the following described means. A hardened bushing 192 is pressed into the front plate 164 at its center. At three equally spaced radii, pins 194 extend through openings in this bushing and the front plate. Each of these pins is pressed toward the center by a spring 196 engaged between a shouldered seat 198 and a plug 200. The spring, seat and plug are disposed in three equally spaced radial holes in the front plate. As best shown in FIG. 3, the plug 200 is held in the head by two screws 202 extending into the front plate and engaging notches on both sides of the plug.

A retainer bushing 204, slidably disposed in an opening in the center of the bushing 192, is provided with three elongated dimples 206 equally spaced about its periphery. Centrally disposed in the dimple is provided a pin 208 having a near conical or chisel-pointed head to match the point of the pin 194. The pin 208 extends through and is slidable in a hole in the bushing 204. Thus the pointed pins 194 act as detent pins on the bushing in two positions, one on each side of the pin 208. In addition to acting as a detent, the pin 194 holds the bushing and prevents it from rotating out of line with the tool and also transmits some of the force of the spring 196 to the headed pin 208 urging it also in an inward direction against the shank 182 or 184 of the tool 154. A dimple 210 formed in the shank 182 at the proper location provides surfaces engaged by the pin 208 which acts as a detent and holds the tool in place in the head.

In each angular space between the pins 194, the bushing 204 is formed as a bearing retainer containing two balls 212. The diameter of these balls is greater than the thickness of the bushing, thus allowing them to roll. When the tool 154 is in its inserted position (FIG. 2), the balls are engaged in a loaded state between the lands of the shank of the tool, and the inner surface of an opening 214 in the bushing 204. Thus the tool is supported at two longitudinal points at each of three circumferential locations. This support is very secure being obtained by the deformation of a steel ball of approximately .0005 inch on the diameter, although this amount may be varied according to the size of tool used. These balls could also press into the grooves or flutes. This is particularly true where three or two flutes are used. In such a case, the flutes could be stepped in a manner similar to the lands in the preferred embodiment.

It will be noted that both the surface of the opening 214 and the lands of the shanks 182 and 184 are stepped, and that these steps are equal so that the balls may be of the same diameter and be equally loaded. As the tool is ejected to the position shown in FIG. 4, the balls are rolled on the bushing 192 by the movement of the tool, thus causing the retainer 204 to move outwardly also. However, the tool does not have to roll out of engagement with both balls in the row. If that were required, movement of the tool and of the retainer 204 would be more than could easily be accommodated. Therefore, the stepped construction is used. As illustrated in FIG. 4, after the tool has rolled a short distance, the balls 212 nearest the outer face of the head roll off a step 216 (FIG. 4) on the shank of the tool. At the same time, the other balls are rolling off a step 218 in the inner surface of the bushing 204. The magnitude of the steps is such that the tool is then released and is free to pass out of the head. At this point, the retainer bushing 204 has moved to the position where the spring-pressed pin 194 has passed over the head of the pin 208, and is thus in position to locate the bushing at its outer position. It will be recognized that by using different sized balls on the two (or more) longitudinal positions, only one of the pressure surfaces need be stepped to accomplish the desired result.

The tool is pushed out of the head by a rod 220 (FIGS. 1 and 2) extending through a central opening 222 in the spindle. The retainer bushing 204 has a hole 224 (FIG. 2) extending through it to receive the rod which can therefore engage the end of the tool to push it. The rod 220 is formed with a shoulder 226 adapted to engage the rear face 228 of the retainer to assure that it is moved to its outer position in place to receive the tool when it is again picked up by the head.

Movement of the rod 220 is induced by a cam and follower arrangement at the opposite end of the spindle from the head (FIG. 1). At this end, a collar 230 is formed on the rod to engage a small ball thrust bearing 232 held in a follower member 234. The follower member is freely journalled on the end of the spindle 98, so that it is carried by the spindle, but leaves the spindle free to rotate while the follower may be sliding longitudinally of the spindle. A roller 236 journalled in the member 234 engages a cam track 238 which extends into a slotted opening in the member 234. A spring 240 engaging the member 234 and the cover 122 urges the member 234 against the cam track 238, but in order to assure positive following by the follower, a radially extending roller 242 may be used engaging the surface of a second cam track 244. The tracks 238 and 244 may preferably be separate for ease of assembly.

In its operation, as explained heretofore, the machine in its preferred embodiment is driven with two motions. The shaft 32 carrying the bull gears 50 rotates in a direction such that the top of the gears are approaching the observer in all figures. The drum carrying the spindles and work holding device rotates in the opposite direction.

In FIGS. 5–12, inclusive, are shown eight positions of the spindle as it passes around the machine. These stations, however, are not stopping points, for the rotation of the device is continuous. The operation of threading the nut may best be explained by a detailed reference to these figures. These figures are viewed from a longitudinally extending plane through a single pair of spindles as they pass around the machine. Each of the figures has been shown in an upright position, including those which normally would have been inverted because they were taken at or near the bottom of the machine. This was done so that comparisons of the figures might be made more easily on uniformly positioned views.

In FIG. 5 which may be taken as the first station, the nut blank has just been injected into a work holding mechanism 84. A clamp 246 is held open by a cam formed on a support 248 and the tool 154 is firmly held in the right-hand head 124 which is substantially fully retracted by the cam on the segments 152. The right hand central rod 220 is also retracted as its follower 234 follows the right hand cam fully to the right. This position can be assumed to be approximately 330 degrees of the cycle. It will be noted that the left hand head 124 is located just slightly to the left of its completely extended position.

Figure 6:
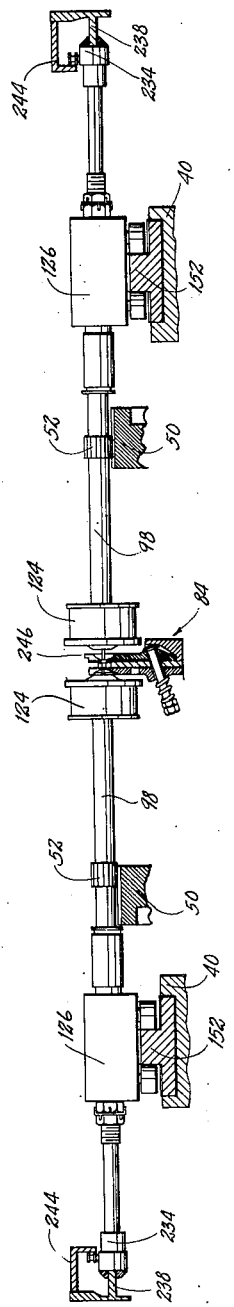

As the spindle moves from the first station to the second station (FIG. 6), the left hand head moves slightly to pick up the tool. At the same time, the right hand head moves quite rapidly to the left causing the tool to enter the hole in the nut blank. During this motion, the hole in the blank is centered on the pilot part 190 of the tool 154 (FIG. 2). This is made possible because the clamp 246 is held open for a sufficient length of time and because a wrench member, as shown at 220 in my aforesaid patent, is allowed a sufficient degree of movement. As soon as the blank is centered, however, the clamp member 246 is released and clamps the nut blank securely against the face plate. The blank is, therefore, properly centered on the tool and is firmly held in position so that the centerline of the threads will be perpendicular to the face of the blank which is against the face plate. The positions of the mechanisms shown in FIG. 6 are those immediately after the clamp is released by the cam, and would appear at approximately 15 degrees of the cycle. It will be noted that the cams 238 follow almost exactly the spindle cams 152 between these stations; the only visible deviation being at about 330 degrees where the left hand head moves forward without the rod 220 following. This, however, is wholly unimportant, for the tool is not held in this head, and the retainer bushing 204 (FIG. 2) has already been positioned as will appear later.

The actual cutting takes place between the second and fourth stations (FIGS. 6–8). In the second station, the left hand head has already engaged the shank of the tool and is driving it on the flutes, although in this embodiment the tool is so short that it has not been firmly seated in the head. The tool is made short so that it will not break as easily because of a long extension and so that it will be more rigid. It will be recognized, however, that with larger tools it would be feasible and might be desirable to seat the tool securely in both heads before starting the thread cutting operation. As the spindles progress, the right head is fed to the left, forcing the tool through the blank. This motion appears between about 30 degrees to just before 150 degrees of the cycle. This is actually the working time of the tool. The cams are designed to feed the tool at the proper pitch for the desired thread, and this is one principal reason for the desirability of easy interchange of cam segments particularly in view of the different pitch thread systems for a single diameter screw now commonly in use.

During the feeding, the left hand head is substantially dwelling at its most extended position. The tool is continuously fed into the head, reversing the rolling of the balls 212 (FIGS. 2 and 4) previously described, and seating the tool firmly in the left hand head. If the rod 220 is not properly retracted to the left at the time, the tool will slide it back against the thrust bearing 232 (FIG. 1). Also during this movement, the retainer bushing 204 is moved back to its position shown in FIG. 4 by the rolling action of the balls.

At the fourth station (FIG. 8), which corresponds to a point near 180 degrees in the cycle, the tool is pushed out of the right hand head by the rod 220 which, in turn, is actuated by the slight rise in the cam which is provided between 150 and 180 degrees of the cycle. The rise in the cam is effective to force the tool out of the grip of the right hand head and to seat it firmly in the left hand head. At the same time, the retainer bushing 204 in the right hand head is positioned by the shoulder 226 on the rod 220.

At this point, too, the left hand head begins to recede from the work holder plates 84 and to carry the tool back with it. As the spindles progress to the fifth station (FIG. 9) the tool 154 is completely withdrawn from the now completed nut. The clamp also is engaged by the cam on the support 248 again and is opened, and the nut is discharged by a pusher bar into an outlet chute.

The next three stations (FIGS. 10–12) show the transfer of the tool from the left hand head to the right hand head. This is accomplished while the clamp is held open and there is nothing held therein. This motion is similar to the passing of the tool in the other direction except that there is no tool feeding cycle, and therefore the exchange can be made more quickly. The exchange, in fact, is accomplished while the spindles pass from about 210 to just past 270 degrees in the cycle. In this space, the right hand head is substantially at a dwell in its furthest extended position. The left hand head quickly approaches it until the tool is completely inserted into the right hand head. As that head begins to pull away at approximately 270 degrees, the left hand cam 238 continues to push its rod 220 outward until the spindle reaches about 285 degrees, thus dislodging the tool from the left hand head and setting the retainer bushing.

As the spindles pass beyond this point, the right hand head is fully retracted whereupon the next nut blank is injected and the cycle starts again.

From the foregoing description, it can be seen that the spindle cam 150 and the push rod cam 238 could be substantially parallel for all except a very small part of the travel of the spindles. Since this is true, it is obvious that the push rod 220 could be carried with spindles throughout most of their travel, and only short wedge-shaped cams used where necessary, to push the tool out of the respective heads. If such cams were to be used, the follower could be merely the end of the push rod which could slide on the cam for a short distance, or the follower could be formed by a ball retained on the end of the rod in a manner described hereinafter with reference to one of the alternative uses of the machine.

During the movement of the spindles longitudinally, they are also rotated because of the meshing of the pinions 52 with the gear 50. Since the spindles on one side are driven in unison with those on the opposite side, they are always in position to pass and receive the tool, and both are effective to drive the tool during the threading operation. The preloaded bearings 106, 112 and 118 (and also the bearing 166 if the housing 156, 158 of FIGS. 2 and 3 is used) are capable of both rotary and longitudinal motion, thus insuring a complete lack of play or whip in the spindles. Thus, the spindles are always true, and since the nut blanks are true, and both tool and blank are securely held, the threads will be cut to much closer tolerances than with prior machines using the conventional type hook tap.

It will be recognized that the number of spindles in a machine built according to my invention is not fixed, but that more or fewer could be used. If more spindles were used and the machine driven at the same rotational speed, the output would be proportionately faster. Thus it is possible with a multi-spindle machine to produce as many as 2500 nuts per minute as compared with present day production with conventional machines of from 50–100 nuts per minute. Moreover, the tool is no more expensive and perhaps less expensive than present day hook taps and, if made of suitable material, will last several times as long measured by the number of nuts produced per tap. This is true because of the complete lack of undesired relative motion between the tap and the nut blank, and because the use of fine fast cutting materials is feasible only with such a small tool. Thus my invention makes possible not only a greater production, but the upkeep cost, so far as tools go, is considerably less.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. In a metal working machine having at least one driven spindle, a tool driving head comprising a body fixed to said spindle for rotation thereby, said body being adapted to hold and drive a tool having a shank of non-cylindrical cross-section, a rigid face plate in said head having a passage therein adapted to receive and snugly engage in driving relation the non-cylindrical shank of such tool, a tool-retaining bushing disposed within said body in axial alignment with said tool passage, a plurality of anti-friction elements in said tool-retaining bushing for supporting the shank of such tool when the same is in operative position within said bushing, and detent means within said head adapted to engage a socket in the shank of such tool when the same is in operative contact with said anti-friction elements for releasably holding the shank of such tool in operative position in said bushing.

2. In a metal working machine having at least one driven spindle, a tool driving head comprising a body fixed to said spindle for rotation thereby, said body being adapted to hold and drive a tool having a shank formed with a plurality of axial ribs, a rigid face plate in said head having a passage therein adapted to receive and snugly engage in driving relation the ribbed shank of such tool, a tool-retaining bushing disposed within said body in axial alignment with said tool passage, a plurality of anti-friction elements in said tool-retaining bushing for supporting the shank of such tool when the same is in operative position within said bushing, and detent means within said head adapted to engage a socket in the shank of such tool when the same is in operative contact with said anti-friction elements for releasably holding the shank of such tool in operative position in said bushing.

3. In a metal working machine having at least one driven spindle, a tool driving head comprising a body fixed to said spindle for rotation thereby, said body being adapted to hold and drive a tool having a shank of non-cylindrical cross-section, a rigid face plate in said head having a passage therein adapted to receive and snugly engage in driving relation the non-cylindrical shank of such tool, a tool-retaining bushing disposed within said body in axial alignment with said tool passage, a plurality of ball bearings in said tool-retaining bushing for supporting the shank of such tool when the same is in operative position within said bushing, and detent means within said head adapted to engage a socket in the shank of such tool when the same is in operative contact with said ball bearings for releasably holding the shank of such tool in operative position in said bushing.

4. In a metal working machine having at least one driven spindle, a tool driving head comprising a body fixed to said spindle for rotation thereby, said body being adapted to hold and drive a tool having a shank of non-cylindrical cross-section, a rigid face plate in said head having a passage therein adapted to receive and snugly engage in driving relation the non-cylindrical shank of such tool, a tool-retaining bushing disposed within said body in axial alignment with said tool passage, a plurality of anti-friction elements in said tool-retaining bushing for supporting the shank of such tool when the same is in operative position within said bushing, and spring press detents within said head adapted to engage a socket in the shank of such tool when the same is in operative contact with said anti-friction elements for releasably holding the shank of such tool in operative position in said bushing.

5. In a metal working machine having at least one driven spindle, a tool driving head comprising a body fixed to said spindle for rotation thereby, said body being adapted to hold and drive a tool having a shank of non-cylindrical cross-section, a rigid face plate in said head having a passage therein adapted to receive and snugly engage in driving relation the non-cylindrical shank of such tool, a tool-retaining bushing disposed within said body in axial alignment with said tool passage, a plurality of pairs of ball bearings in said tool-retaining bushing for supporting the shank of such tool when the same is in operative position within said bushing, and a plurality of detents within said head adapted to engage a slot in the shank of such tool when the same is in operative contact with said ball bearings for releasably holding the shank of such tool in operative position in said bushing.

6. In a metal working machine having at least one driven spindle, a tool driving head comprising a body fixed to said spindle for rotation thereby, said body being adapted to hold and drive a tool having a shank formed with a plurality of axial ribs, a rigid face plate in said head having a passage therein adapted to receive and snugly engage in driving relation the ribbed shank of such tool, a tool-retaining bushing disposed within said body in axial alignment with said tool passage, a plurality of pairs of ball bearings in said tool-retaining bushing for supporting the shank of such tool when the same is in operative position within said bushing, and a plurality of spring pressed detents within said head adapted to engage a socket in the shank of such tool when the same is in operative contact with said ball bearings for releasably holding the shank of a tool in contact with such tool in operative position in said bushing.

7. In a metal working machine having at least one driven spindle, a tool driving head comprising a body adapted to be fixed to said spindle for rotation thereby, said head being adapted to hold and drive a tool having a shank of non-cylindrical cross-section and being rearwardly stepped to provide a minor diameter at the end of the shank and a major diameter inwardly thereof, a rigid wall in said head having a passage therein adapted to receive and snugly engage in driving relation the non-cylindrical shank of such tool, a reciprocating tool-retaining bushing disposed within said body, a fixed supporting surface within said body embracing and maintaining said tool-retaining bushing in alignment with said tool passage for receiving the stepped shank of such tool, said fixed supporting surface having a forwardly stepped portion providing a minor and a major diameter opposite, respectively, the minor and the major diameters of the tool when the latter is in operative position within said tool-retaining bushing, through sockets in said retaining bushing over said major and minor diameters of said supporting surface, a first anti-friction element in said socket over said major diameter and a second anti-friction element in said socket over said minor diameter adapted to provide a supporting surface tightly engaging the stepped end of the tool shank when a tool is in operative position in said supporting bushing, and means for moving said tool-retaining bushing and a tool therein forwardly from its operative position whereby the minor diameter of the shank registers with said first anti-friction element and said second anti-friction element is moved into said major diameter of said supporting surface to release the tool from engagement by said elements.

8. In a metal working machine having at least one driven spindle, a tool driving head comprising a body adapted to be fixed to said spindle for rotation thereby, said head being adapted to hold and drive a tool having a shank of non-cylindrical cross-section and being rearwardly stepped to provide a minor diameter at the end of the shank and a major diameter inwardly thereof, a rigid wall in said head having a passage therein adapted to receive and snugly engage in driving relation the non-cylindrical shank of such tool, a tool-retaining bushing disposed within said body in alignment with said tool passage for receiving the stepped shank of such tool and mounted therein for reciprocation from an operative position to a forward tool releasing position, a forwardly stepped supporting surface for said retaining bushing providing a minor and a major diameter opposite, respectively, the minor and the major diameters of the tool when the latter is in operative position, through sockets in said retaining bushing over said major and minor diameters of said supporting surface, a first anti-friction element in said socket over said major diameter and a second anti-friction element in said socket over said minor diameter adapted to provide a supporting surface tightly engaging the stepped end of the tool shank when a tool is in operative position in said supporting bushing, means for reciprocating said tool-retaining bushing and a tool therein forwardly from its operative position whereby the minor diameter of the shank registers with said first anti-friction element and said second anti-friction element is moved into said major diameter of said supporting surface to release the tool from engagement by said elements, and a detent for holding said supporting bushing in its operative position and also in its tool releasing position.

9. In a metal working machine having at least one driven spindle, a tool driving head comprising a body adapted to be fixed to said spindle for rotation thereby, said head being adapted to hold and drive a tool having a shank of non-cylindrical cross-section and being rearwardly stepped to provide a minor diameter at the end of the shank and a major diameter inwardly thereof, a rigid wall in said head having a passage therein adapted to receive and snugly engage in driving relation the non-cylindrical shank of such tool, a reciprocating tool-retaining bushing disposed within said body, a fixed supporting surface within said body embracing and maintaining said tool-retaining bushing in alignment with said tool passage for receiving the stepped shank of such tool, said fixed supporting surface having a forwardly stepped portion providing a minor and a major diameter opposite, respectively, the minor and the major diameters of the tool when the latter is in operative position within said tool-retaining bushing, through sockets in said retaining bushing over said major and minor diameters of said supporting surface, a first anti-friction element in said socket over said major diameter and a second anti-friction element in said socket over said minor diameter adapted to provide a supporting surface tightly engaging the stepped end of the tool shank when a tool is in operative position in said supporting bushing, means for moving said tool-retaining bushing and a tool therein forwardly from its operative position whereby the minor diameter of the shank registers with said first anti-friction element and said second anti-friction element is moved into said major diameter of said supporting surface to release the tool from engagement by said elements, and a plurality of spring pressed detents adapted to engage a tool and press it into engagement with said anti-friction elements, said detents also having means engaging said tool-retaining bushing for holding the same in its operative and in its forwardly moved position.

10. In a metal working machine having at least one driven spindle, a tool driving head comprising a body adapted to be fixed to said spindle for rotation thereby, said head being adapted to hold and drive a tool having a shank of non-cylindrical cross-section and being rearwardly stepped to provide a minor diameter at the end of the shank and a major diameter inwardly thereof, a rigid wall in said head having a passage therein adapted to receive and snugly engage in driving relation the non-cylindrical shank of such tool, a reciprocating tool-retaining bushing disposed within said body, a fixed supporting surface within said body embracing and maintaining said tool-retaining bushing in alignment with said tool passage for receiving the stepped shank of such tool, a forwardly stepped portion providing a minor and a major diameter opposite, respectively, the minor and the major diameters of the tool when the latter is in operative position within said tool-retaining bushing, through sockets in said retaining bushing over said major and minor diameters of said supporting surface, a first ball bearing in said socket over said major diameter and a second ball bearing in said socket over said minor diameter adapted to provide a supporting surface tightly engaging the stepped end of the tool shank when a tool is in operative position in said supporting bushing, and means for moving said tool-retaining bushing and a tool therein forwardly from its operative position whereby the minor diameter of the shank registers with said first ball bearing and said second ball bearing is moved into said major diameter of said supporting surface to release the tool from engagement by said elements.

11. In a metal working machine having at least one driven spindle, a tool driving head comprising a body adapted to be fixed to said spindle for rotation thereby, said head being adapted to hold and drive a tool having a shank of non-cylindrical cross-section and being rearwardly stepped to provide a minor diameter at the end of the shank and a major diameter inwardly thereof, a rigid wall in said head having a passage therein adapted to receive and snugly engage in driving relation the non-cylindrical shank of such tool, a reciprocating tool-retaining bushing disposed within said body, a fixed supporting surface within said body embracing and maintaining said tool-retaining bushing in alignment with said tool passage for receiving the stepped shank of such tool, said fixed supporting surface having a forwardly stepped portion providing a minor and a major diameter opposite, respectively, the minor and the major diameters of the tool when the latter is in operative position within said tool-retaining bushing, through sockets in said retaining bushing over said major and minor diameters of said supporting surface, a first anti-friction element in said socket over said major diameter and a second anti-friction element in said socket over said minor diameter adapted to provide a supporting surface tightly engaging the stepped end of the tool shank when a tool is in operative position in said supporting bushing, and a sliding rod mounted axially within said spindle for engaging and moving said tool-retaining bushing and a tool therein forwardly from its operative position whereby the minor diameter of the shank registers with said first anti-friction element and said second anti-friction element is moved into said major diameter of said supporting surface to release the tool from engagement by said elements.

12. In a metal working machine having at least one driven spindle, a tool driving head comprising a body adapted to be fixed to said spindle for rotation thereby, said head being adapted to hold and drive a tool having a shank of non-cylindrical cross-section and being rearwardly stepped to provide a minor diameter at the end of the shank and a major diameter inwardly thereof, a rigid wall in said head having a passage therein adapted to receive and snugly engage in driving relation the non-cylindrical shank of such tool, a reciprocating tool-retaining bushing disposed within said body, a fixed supporting surface within said body embracing and maintaining said tool-retaining bushing in alignment with said tool passage for receiving the stepped shank of such tool, an axial through passage in said retaining bushing, said fixed supporting surface having a forwardly stepped portion providing a minor and a major diameter opposite, respectively, the minor and the major diameters of the tool when the latter is in operative position within said tool-retaining bushing, through sockets in said retaining bushing over said major and minor diameters of said supporting surface, a first anti-friction element in said socket over said major diameter and a second anti-friction element in said socket over said minor diameter adapted to provide a supporting surface tightly engaging the stepped end of the tool shank when a tool is in operative position in said supporting bushing, and a sliding rod mounted axially within said spindle, said rod having a reduced diameter adapted to enter said axial through passage of said retaining bushing and engage the end of a tool therein and a shoulder adapted to engage said retaining bushing, means for reciprocating said rod for moving said tool-retaining bushing and a tool therein forwardly from its operative position whereby the minor diameter of the shank registers with said first anti-friction element and said second anti-friction element is moved into said major diameter of said supporting surface to release the tool from engagement by said elements.

13. In a metal working machine having at least one driven spindle, a tool driving head comprising a body adapted to be fixed to said spindle for rotation thereby, said head being adapted to hold and drive a tool having a shank of fluted cross-section and being rearwardly stepped to provide a minor diameter at the end of the shank and a major diameter inwardly thereof, a rigid face plate on said head having a passage therein adapted to receive and snugly engage in driving relation the fluted shank of such tool, a reciprocating tool-retaining bushing disposed within said body, a fixed supporting surface within said body embracing and maintaining said tool-retaining bushing in alignment with said tool passage for receiving the stepped shank of such tool, fixed supporting surface having a forwardly stepped portion providing a minor and a major diameter opposite, respectively, the minor and the major diameters of the tool when the latter is in operative position within said tool-retaining bushing, through sockets in said retaining bushing over said major and minor diameters of said supporting surface, a first anti-friction element in said socket over said major diameter and a second anti-friction element in said socket over said minor diameter adapted to provide a supporting surface tightly engaging the stepped end of the tool shank when a tool is in operative position in said supporting bushing, and means for moving said tool-retaining bushing and a tool therein forwardly from its operative position whereby the minor diameter of the shank registers with said first anti-friction element and said second anti-friction element is moved into said major diameter of said supporting surface to release the tool from engagement by said elements.

References Cited in the file of this patent

UNITED STATES PATENTS

| | | |
|---|---|---|
| Re 14,086 | Daniels | Mar. 14, 1916 |
| 437,713 | Newbury | Oct. 7, 1890 |
| 1,458,300 | Jarvis | June 12, 1923 |
| 1,538,670 | Stanley | May 19, 1925 |
| 1,747,418 | Bishop | Feb. 18, 1930 |
| 2,388,779 | Boehmler | Nov. 13, 1945 |
| 2,579,081 | Koch | Dec. 18, 1951 |

FOREIGN PATENTS

| | | |
|---|---|---|
| 556,681 | Great Britain | Oct. 15, 1943 |